United States Patent
Wassmer (10) Patent No.: US 6,832,879 B2
(45) Date of Patent: Dec. 21, 2004

(54) MACHINE TOOL FOR AT LEAST PARTIAL CONTOUR-DEPENDENT CUTTING OR MILLING

(75) Inventor: Paul Wassmer, Heitersheim (DE)

(73) Assignee: Wassmer Spezialmaschinen GmbH, Heitersheim (DE)

(*) Notice: Subject to any disclaimer, the term of this patent is extended or adjusted under 35 U.S.C. 154(b) by 0 days.

(21) Appl. No.: 10/387,298

(22) Filed: Mar. 12, 2003

(65) Prior Publication Data

US 2003/0175087 A1 Sep. 18, 2003

(30) Foreign Application Priority Data

Mar. 12, 2002 (DE) ..................... 202 03 938 U (51) Int. Cl.[7] ............................................. B23C 1/06
(52) U.S. Cl. ............... 409/197; 409/218; 409/214; 409/193; 409/185; 144/250.13; 144/250.16
(58) Field of Search ..................... 409/218, 214, 409/183, 185, 189, 197; 144/250.13, 250.16; 408/183, 185, 189, 197; 269/21

(56) References Cited

U.S. PATENT DOCUMENTS

| | | | |
|---|---|---|---|
| 3,858,630 A | | 1/1975 | Cherry et al. |
| 4,304,512 A | * | 12/1981 | Vierstraete ................... 409/191 |
| 4,382,728 A | * | 5/1983 | Anderson et al. ........... 409/235 |
| 4,808,046 A | * | 2/1989 | Pilkington et al. .......... 409/219 |
| 4,830,075 A | | 5/1989 | Jenkner |
| 4,945,959 A | | 8/1990 | Biedenbach |
| 4,946,320 A | * | 8/1990 | VanderMey ................. 409/132 |
| 4,966,508 A | * | 10/1990 | Otani et al. .................. 409/189 |
| 5,094,282 A | * | 3/1992 | Suzuki et al. ............ 144/252.1 |
| RE34,125 E | * | 11/1992 | Amos et al. ................. 409/197 |
| 6,305,446 B1 | * | 10/2001 | Showan ................... 144/250.12 |
| 6,626,617 B2 | * | 9/2003 | Lorber et al. ................ 409/132 |

FOREIGN PATENT DOCUMENTS

| | | |
|---|---|---|
| DE | 1 805 713 | 12/1969 |
| DE | 27 26 382 | 12/1978 |
| DE | 38 18 521 | 12/1989 |
| DE | 44 00 237 | 7/1995 |
| DE | 196 31 630 | 2/1998 |
| DE | 197 22 465 | 1/1999 |
| DE | 100 26 069 A1 | 5/2000 |
| EP | 1 151 834 | 11/2001 |
| EP | 03 00 3521 | 5/2003 |

* cited by examiner

Primary Examiner—A. L. Wellington
Assistant Examiner—Dana Ross
(74) Attorney, Agent, or Firm—Volpe and Koenig, P.C.

(57) ABSTRACT

A machine tool (1) for the at least partial machining, contour-dependent cutting or milling of a component from a plate-shaped workpiece (2), for example a wood plate, is provided, and includes a suction device used as a clamping device for engaging on the back side or lower side of the workpiece (2). A second clamping device including at least one hold-down device (6) that is used to apply pressure to the side of the workpiece (2) facing away from the suction device (3) and (4) is provided. The hold-down device (6) has on its contact region that applies pressure to the workpiece (2) at least one or two spaced-apart pressure rollers (7), and is displaceable under pressure relative to the workpiece (2) transversely to the axis of the pressure roller(s) (7). The displacement is synchronous with a tool (8) used for the machining of workpiece (2), which tool can preferably be situated between the two spaced-apart pressure rollers (7).

8 Claims, 8 Drawing Sheets

Fig. 3

Schnitt A-A
Fig. 7

Schnitt B-B
Fig. 8

MACHINE TOOL FOR AT LEAST PARTIAL CONTOUR-DEPENDENT CUTTING OR MILLING

BACKGROUND

The invention relates to a machine tool for at least partial machining, contour-dependent cutting, or milling of a clampable part made from a plate-shaped workpiece, having a suction apparatus, provided for engaging the back side or lower side of the workpiece, that acts as a clamping device and that has individual suction devices which can in particular be situated in displaceable fashion on a machine frame of the machine.

Machines of this sort are known in many forms. The clamping of the workpiece in such machines takes place using a suction apparatus that can engage on the back side or lower side of the workpiece, which has the advantage that this suction apparatus can be adjusted or displaced according to the shape of the workpiece. In addition, the edges of the workpiece remain free, so that they are easily accessible and can be reached correspondingly well and machined using a tool. Even profilings, or recesses to be made in the narrow side of a plate-shaped workpiece, can be machined.

However, in many cases workpieces must be machined from a material that is air permeable. Moreover, such workpieces, especially if they are made of wood, can be warped or have faults and then cannot be grasped in the area of individual suction devices of the suction apparatus so that the workpiece can be displaced or even entirely torn away during the machining. Besides the resulting spoilage, this also presents a risk to the user.

If, for example, relatively thin workpieces having the same contour are to be manufactured, they can be deformed by the suction apparatus and its individual suction devices. Moreover, it is time-consuming if a plurality of identical individual pieces having the same contour must be produced one after the other on the same machine.

SUMMARY

The object therefore arises of creating a machine of the type named above that retains the advantages of a fastening of the workpiece using suction apparatuses that leave a workpiece surface entirely free, but in which it is also possible to machine workpieces that are made of an air permeable material and/or that have warped or deformed or similar uneven sections.

In order to achieve this apparently self-contradictory goal, it is provided that the machine has as a second clamping device that is used to apply pressure to the side of the workpiece facing away from the suction device as a hold-down device, and that the hold-down device has, on its contact region that applies pressure to the workpiece, at least one or two pressure rollers at a distance from one another, and the hold-down device can, under pressure, be displaced relative to the workpiece, transversely to the axis of the pressure roller, and that the hold-down device can be displaced synchronously with a tool that is used for the machining of the workpiece.

Surprisingly, the machine tool according to the present invention is thus outfitted with two clamping devices of different types, namely with the already-mentioned suction apparatus and additionally with the hold-down device, which likewise acts as a clamping device. In this way, it is possible to clamp even workpieces that cannot be suctioned because they let too much air through, or that have warped or uneven spots that cannot be grasped uniformly at all suction heads or suction points. Moreover, it is possible for workpieces having congruent contours to be clamped simultaneously as a stack, with the aid of the hold-down device, and then machined. If necessary, here the clamping can additionally be supported by the suction apparatus, which additionally grasps at least the lowest workpiece of such a stack.

The user thus has the possibility, optionally and according to the requirements of the edge contour that is to be manufactured, etc., of fixing the workpiece using the suction device, or using the hold-down device, or, in particular cases, using both clamping devices. In this way, the apparent excess expense in equipment is compensated in that a further machine tool is not required for workpieces that cannot be clamped with sufficient stability using a suction device.

Because the hold-down device, at its contact region that applies pressure to the workpiece, has at least one or two pressure rollers set at a distance from one another, and can be displaced, under pressure, relative to the workpiece, transversely to the axis of the pressure rollers, the rollers can roll on the surface of the tool. This allows the hold-down device to optionally be used on the workpiece at the points at which correspondingly large forces, coming in particular from the tool, are to be received. Here, due to the synchronous displaceability, the clamping point formed by this pressure roller or pressure rollers can migrate together with the tool, with its machining advance, and can always act at the point at which the machining forces occur.

A particularly useful preferred embodiment of the invention is provided in that the at least two pressure rollers of the hold-down device are situated parallel to one another, and at a distance from one another, and are connected with an advancement device or feeder for the tool. In this way, the synchronous movement of the hold-down device and of the tool is achieved automatically, and can be brought about using a single drive.

The tool, in particular a milling cutter, can be situated in the intermediate space between the two pressure rollers, and the advance device for the displacement of the tool can also be used for the displacement of the pressure rollers of the hold-down device. In this way, the respective machining point on the workpiece is clamped fast particularly reliably, because the holding down takes place on both sides of the tool, immediately adjacent thereto. This arrangement can correspond approximately to that known from DE 27 26 382 C3, and can have an analogous manner of operation.

The suction apparatus can have at least one, or preferably a plurality, of suction consoles, on which individual suction devices are situated detachably and removably, as well as adjustably, and an exchangeable base plate can be provided as support for a workpiece, with the base plate fitting onto the suction console and acting thereon as a support for workpieces that can be clamped using the hold-down device. The user can thus remove the suction heads, and can create a stable support with the aid of a base plate for workpieces that during their machining are to be pressed with great force onto a surface that is as flat as possible. However, it is also possible to apply a workpiece immediately onto the suction heads, and to hold it (or hold it additionally) with the hold-down device.

In an especially advantageous embodiment of the present invention, and therefore worthy of independent protection, a stop rail can be situated on at least one edge of the machining or bearing surface for the workpiece, and this rail can be moved away from its stop position so as to expose the edge of a workpiece previously aligned thereon. Thus, a user can orient a workpiece, for example a plate of wood, or also plates of wood situated one on top of the other with the aid of this stop rail, as is also often customarily done in other cases of wood machining in particular, after which the workpiece is then clamped. If the edge of this workpiece with which the workpiece has been applied to the stop rail is to be machined, this edge can also be machined in unhindered fashion after the rail has been moved away.

Here, it is particularly advantageous if the stop rail extends over the entire dimension of one side of the working surface, and in particular has on at least one end an additional stop or sliding stop that protrudes at a right angle to the orientation thereof, and that can be displaced and fixed in the longitudinal direction of the stop rail if necessary. In this way, in particular rectangular workpieces can be properly aligned, because they can be applied to the stop rail and to an additional stop not only with one edge, but also with an edge at a right angle thereto, and in this way can be aligned.

The stop rail can be fastened to swivel arms that can in particular be swiveled approximately in a plane situated parallel to the working surface, or that is in accordance with the working surface. The stop rail could also for example be swiveled behind or under the working surface from its position of use, but often there is no space there, so that a swiveling that takes place approximately in the plane of the working surface is also advantageous for reasons of space. If necessary, such a swiveling arrangement can also be used for the displacement of the stop element position.

Swivel arms can engage on the stop element that are situated parallel to one another and can be swiveled synchronously, about their swivel axis, at a distance from the stop rail, by drive arms that are situated parallel to one another and offset in relation to the swivel arms by an angular distance, on which there engages a rotational drive or, if necessary a connecting rod and a drive. Using a plurality of swivel arms, preferably two, a relatively long rail can be swiveled practically parallel to itself from the position of use into an idle position. Here, the drive arms can be situated at an angle to the respective swivel arm in order to have a position relative to a drive that is as advantageous as possible.

It is also particularly advantageous for the acceptance of contact forces if, in the position of use of the stop rail, the swivel arms are situated at a right angle to this rail and the actuating arms are situated so as to be displaced thereto by an acute angle, for example by approximately 45°, so that a swiveling of the drive arms by 90° brings the swivel arms and the stop rail into accordance with one another. In this way, the arrangement has a relatively low space requirement.

BRIEF DESCRIPTION OF THE DRAWINGS

In the following, an exemplary embodiment of the present invention is explained in more detail on the basis of the drawing. The following are shown in partly schematic representation.

DETAILED DESCRIPTION OF THE PREFERRED EMBODIMENTS

A machine tool, designated 1 as a whole, and also referred to in the following as "machine 1," is used for the at least partial contour-dependent cutting or milling of a component from a plate-shaped workpiece 2, in a manner approximately analogous to that found in DE 27 26 382 C3.

The machine 1 has a suction apparatus having suction consoles 3 on which individual suction devices or suction heads 4 are situated, said device acting as a clamping device and being provided in order to grasp the back side or lower side of a workpiece 2. The suction consoles 3 and also suction heads 4 are situated in displaceable fashion on a machine frame 5 in order to enable adaptation to workpieces 2 having various dimensions.

Figure 1:
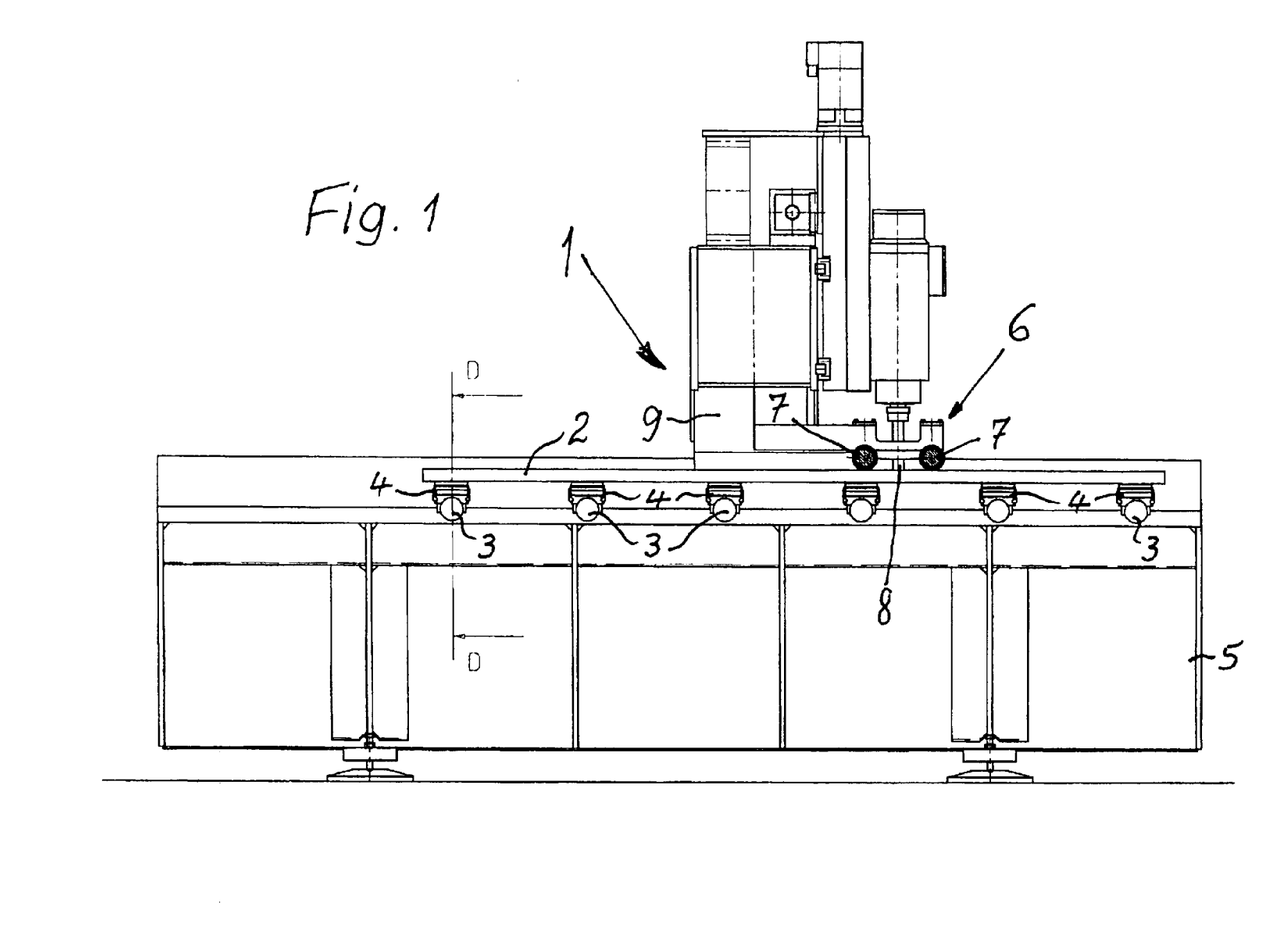
FIG. 1 is a side view of a machine according to the present invention, in which a workpiece is held fast by the suction devices or suction heads of a suction apparatus.
Figure 2:
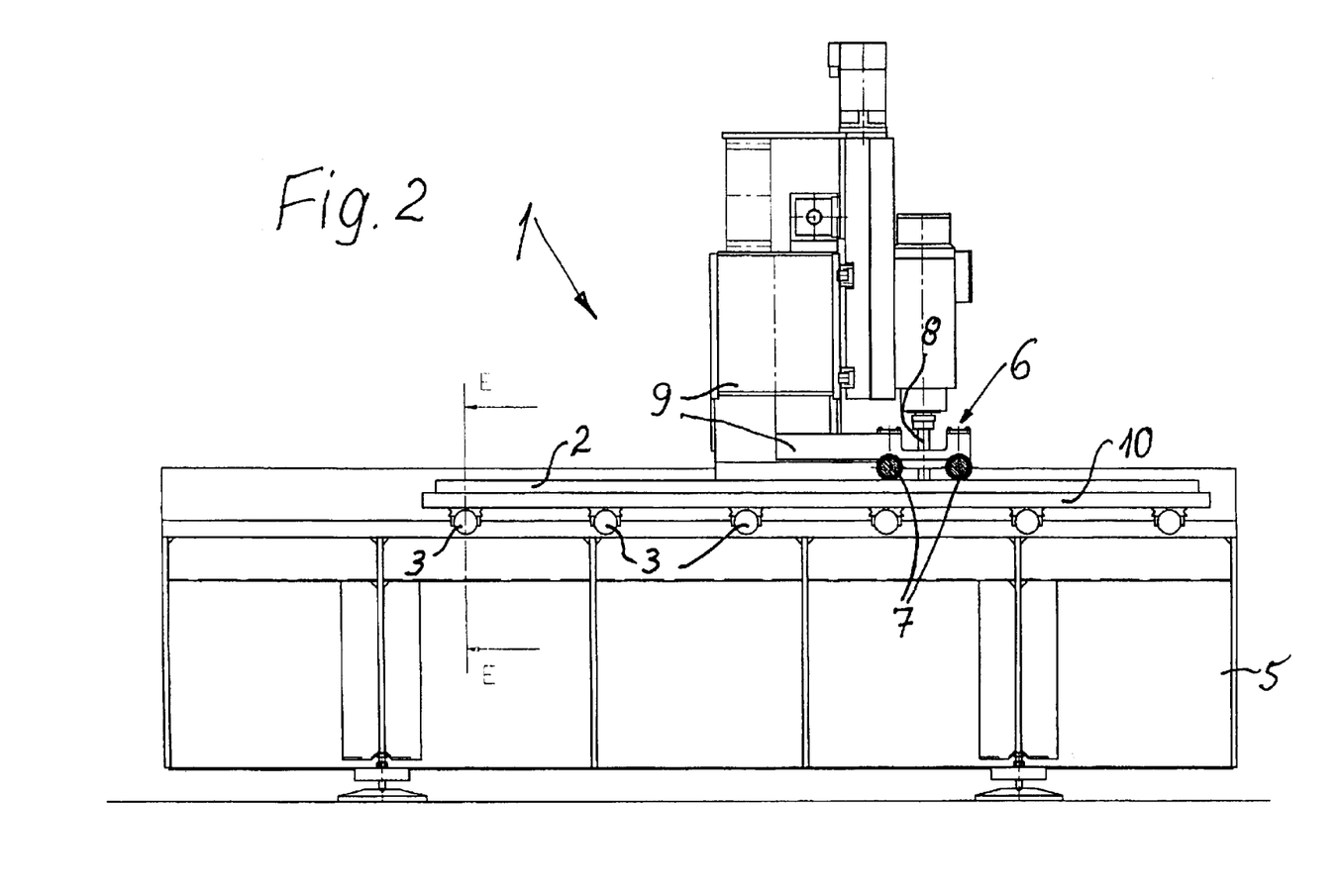
FIG. 2 is a view corresponding to FIG. 1 of the machine according to the present invention, in which the suction heads have been removed and a base plate has been placed on the suction consoles that bears the workpiece, which is clamped fast in the area of the tool by a hold-down device provided as a second clamping device.
Figure 3:
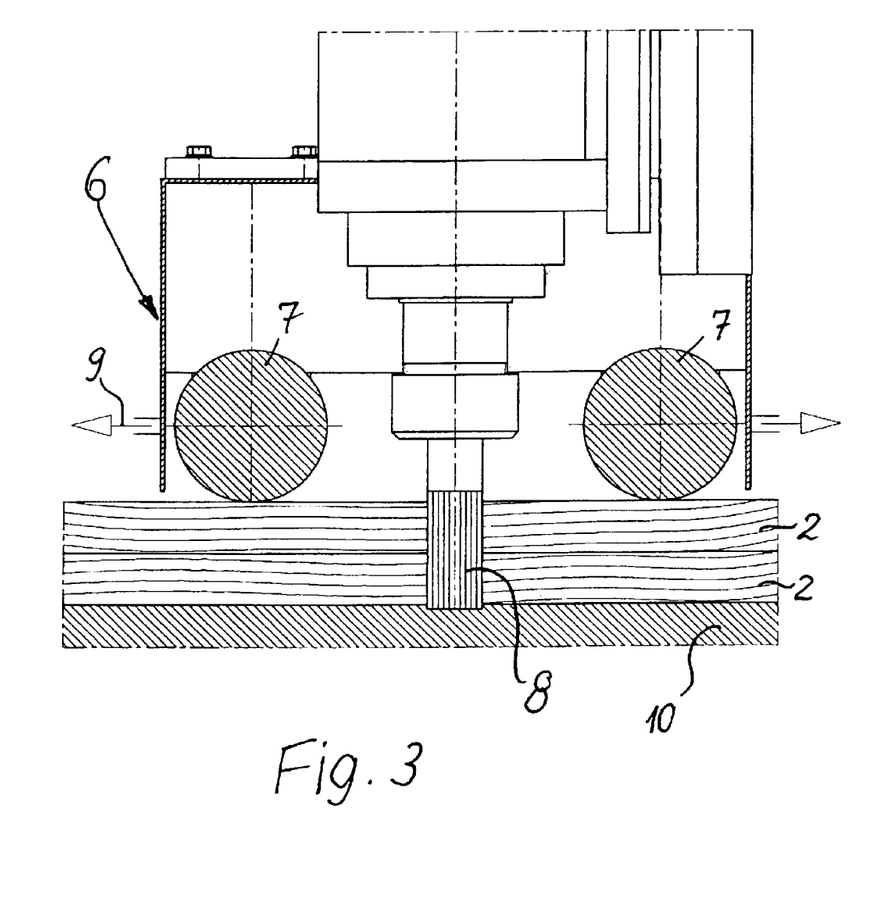
FIG. 3 is an enlarged representation, partially in cross-section, of the hold-down device according to the present invention shown with two pressure rollers that are situated on each side of the tool and that belong to the hold-down device, which rollers fix the workpiece (in the exemplary embodiment, a stack of two workpieces) in the area of the tool, the hold-down device being movable together with the tool.

In FIGS. 1 to 3, it can be seen that the machine 1 has a second clamping device, i.e., a hold-down device 6, which is used to apply pressure to the side of the workpiece 2 facing away from the suction device 3,4. The workpiece 2 can thus optionally be fastened with the aid of the suction devices 4, or with the hold-down device 6, or with both simultaneously if necessary.

In the preferred exemplary embodiment, the hold-down device 6 according to FIGS. 1 to 3 has, on its contact area that applies pressure to the workpiece 2, two pressure rollers 7 situated at a distance from one another, which can also be displaced, under pressure, relative to the workpiece 2, transversely to their axis of rotation. The hold-down device 6 can be displaced synchronously with a tool 8 used for the machining of the workpiece 2 (a milling cutter according to FIG. 3), the two pressure rollers 7 of the hold-down device 6 being connected with an advancing or feed device 9 for the tool 8, so that the clamping of the workpiece 2 can always take place in the area of the tool 8, even if the tool 8 changes its position during the course of the machining.

The length of the pressure rollers 7 corresponds approximately to the width of the workpiece 2 to be machined, or to the width or length of the base plate provided on the machine 1 for the tool 2, so that a secure clamping of the workpiece can take place not only with the suction device, but also with the hold-down device 6 and its pressure rollers 7, with the tool 8 also being displaceable between pressure rollers 7, parallel thereto, i.e., perpendicular to the plane of the drawing.

Above all, in FIG. 3 it can be seen that the tool 8 is situated in the intermediate space between the two pressure rollers 7, i.e., the respective machining point is clamped as well as possible, and the advancing device 9 for the displacement of tool 8 also being used for the displacement of the pressure rollers 7 of the hold-down device 6.

The suction device has the already-mentioned suction consoles 3, which are situated parallel to one another, and on which the individual suction heads 4 are situated in detachable and removable fashion, as can be seen by comparing FIGS. 1 and 2.

Moreover, FIG. 2 shows that an exchangeable base plate 10 can be provided as a support for the workpiece 2; said base plate fits onto suction consoles 3 and can be used thereon as a support for the workpieces 2 that are clamped using the hold-down device 6. FIGS. 2 and 3 show this arrangement. In this case, during machining, the workpiece 2 is clamped only by the hold-down device 6 and its pressure rollers 7. Here, according to FIGS. 3 to 8, fashioned as a milling cutter, can also engage somewhat in the base plate or working plate 10, because as a rule this plate is made of wood or wood-type material, and can be exchanged after a certain period of wear.

FIG. 2 illustrates that the clamping with the aid of the hold-down device 6 has the advantage that it is also possible simultaneously to machine a plurality of workpieces 2 stacked on one another; in the exemplary embodiment, these are two such plate-shaped workpieces 2.

Figure 4:
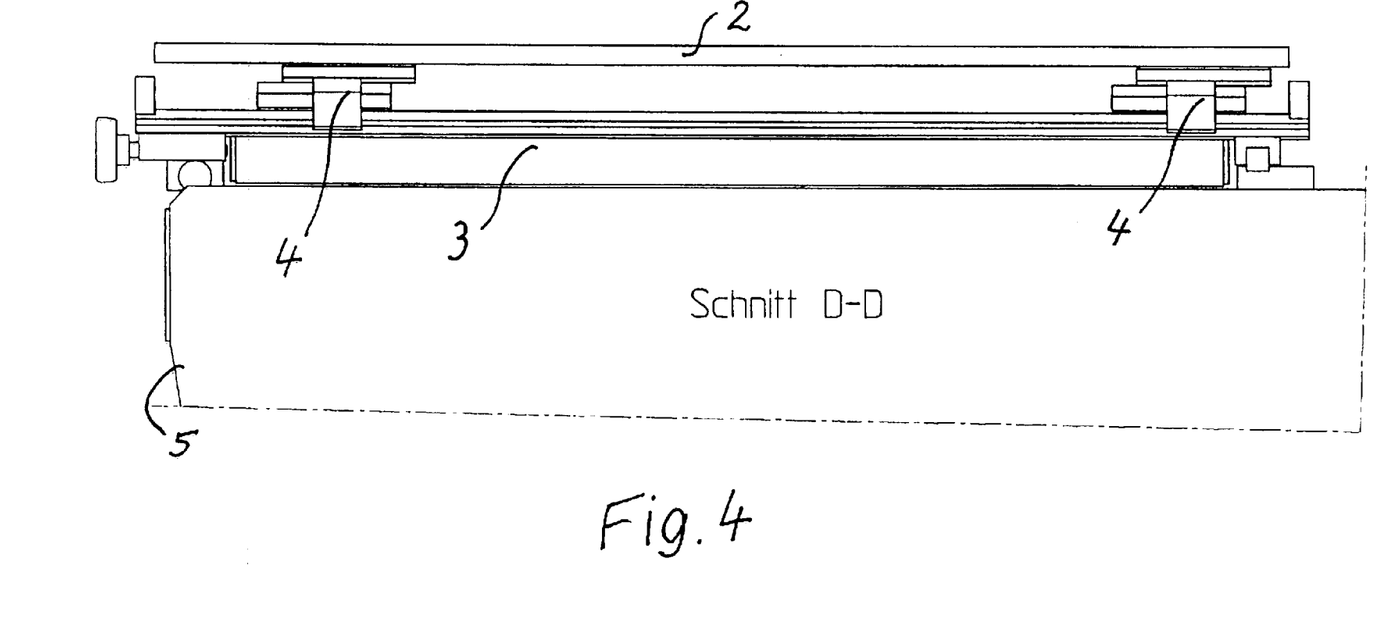
FIG. 4 is a cross-section of the machine in the area of a suction console according to the section line D—D in FIG. 1, with a suction console, two suction devices or suction heads situated thereon, and a workpiece fixed thereby.
Figure 5:
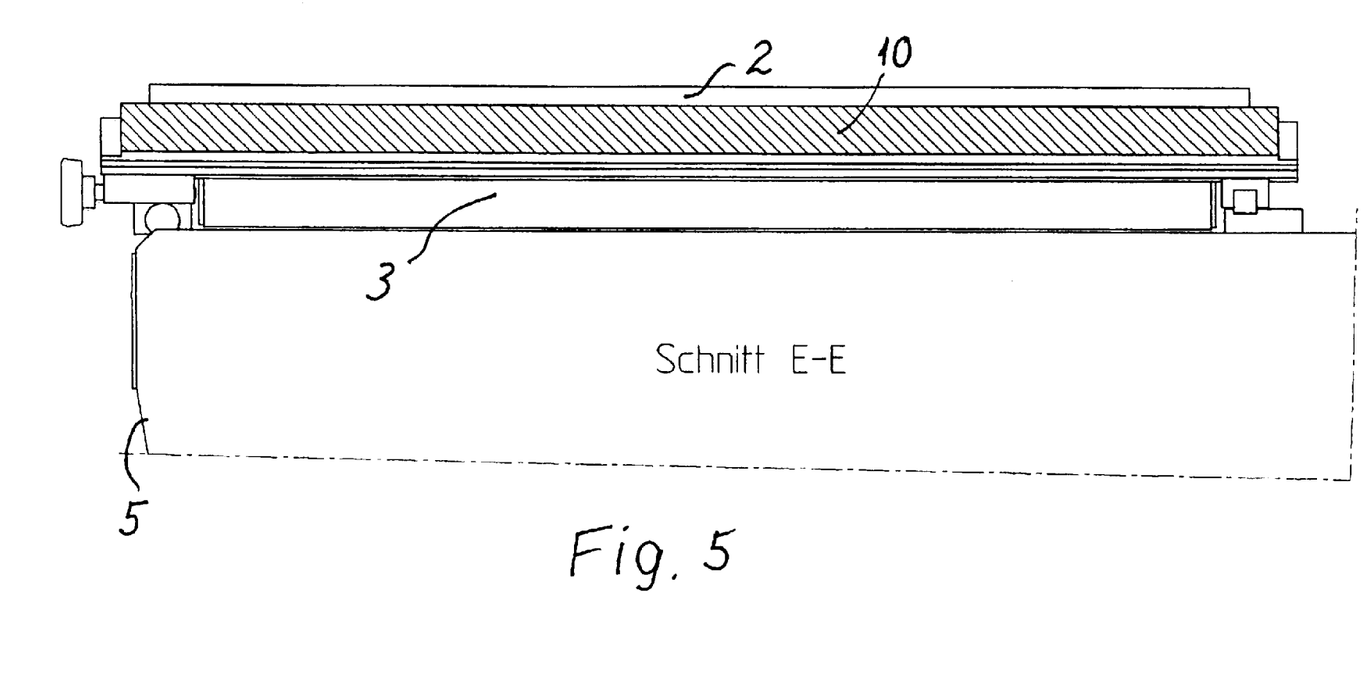
FIG. 5 is a view corresponding to that shown in FIG. 4, i.e., a cross-section of the machine according to the section line E—E in FIG. 2, in which the suction heads have been removed and replaced by a base plate for the workpiece.

The fixing of a workpiece 2 with the aid of the displaceable suction heads 4, situated on the likewise displaceable suction consoles 3, is illustrated in FIG. 4, while FIG. 5 shows the supporting of the workpiece 2 on a working plate or base plate 10 that is placed onto the suction consoles 3 after the suction heads 4 have been removed.

Figure 6:
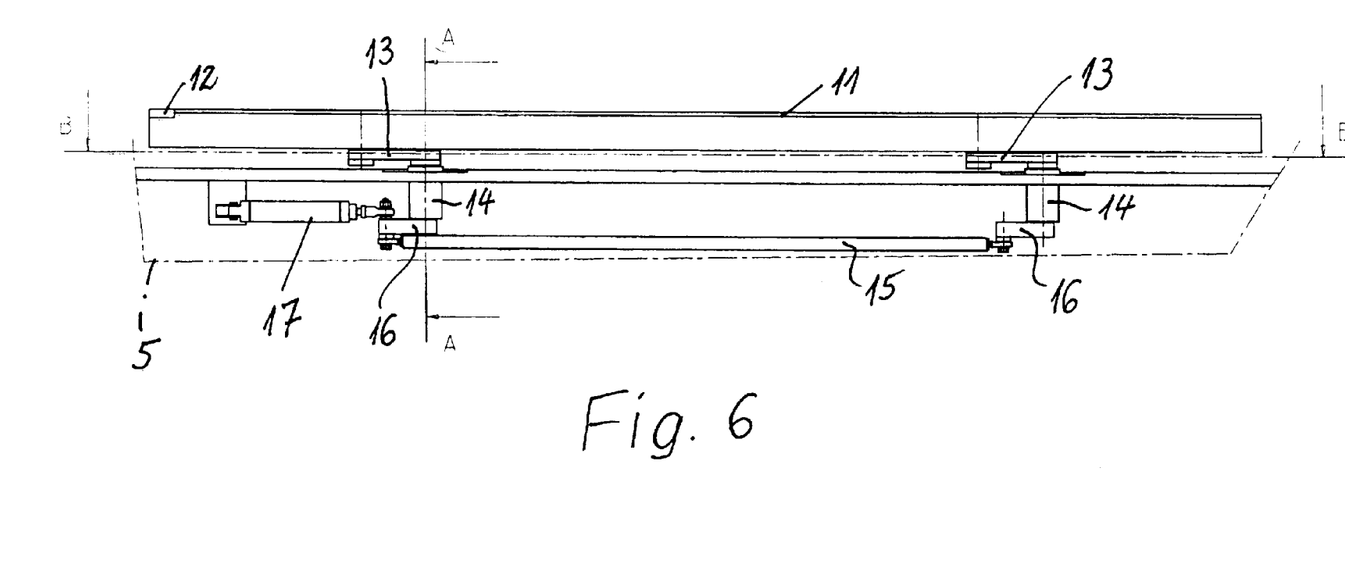
FIG. 6 is a side view of a stop rail situated on at least one longitudinal or transverse side of the workpiece bearing surface of the machine on its machine tool table, with its swivel drive for swiveling this stop rail into the position of use or into an idle position.
Figure 7:
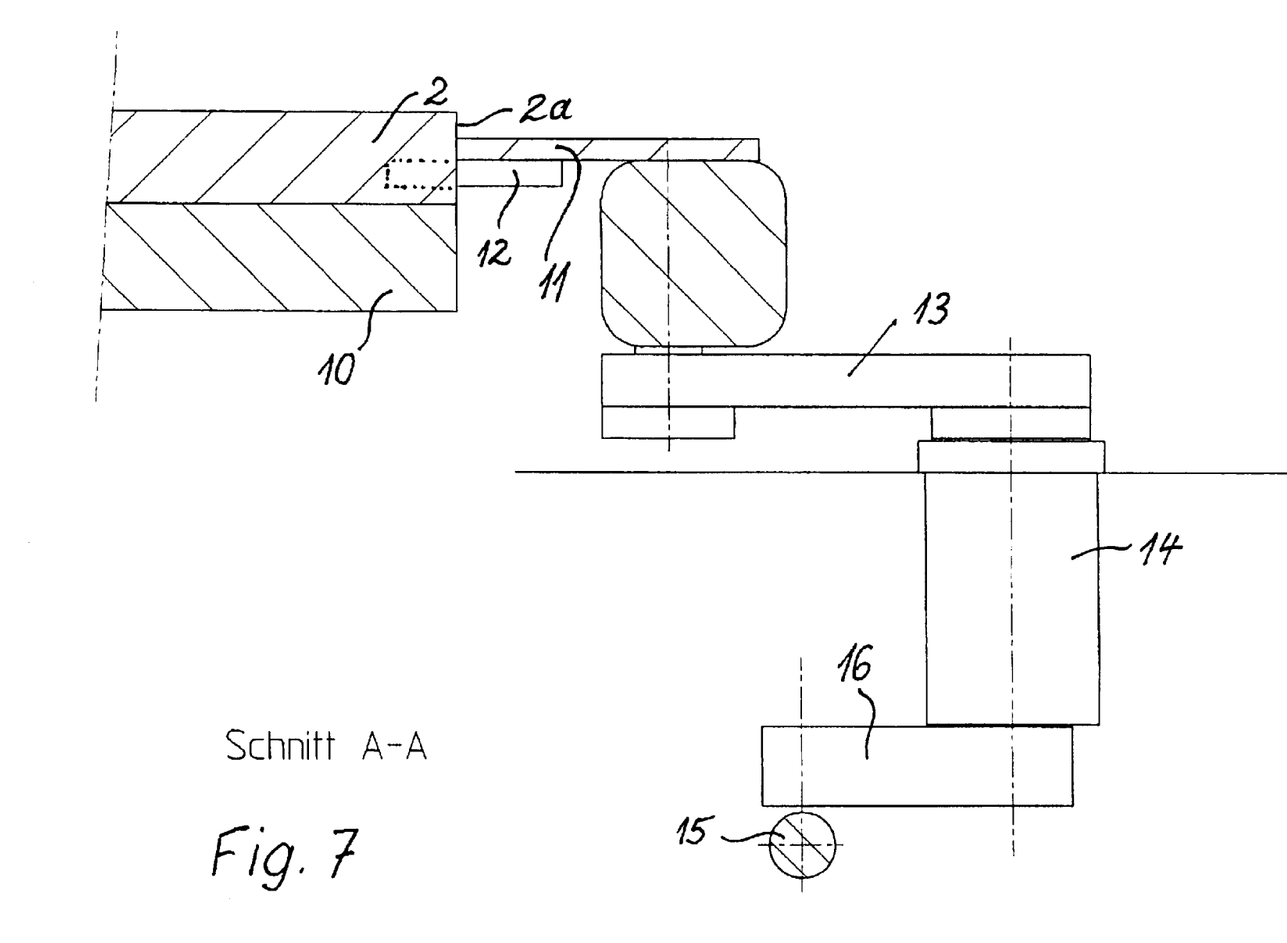
FIG. 7 is an enlarged view of a cross-section of the stop rail, and of a swivel bearing used to swivel this rail into an idle position, in which the edge region, facing the rail, of a base plate and a workpiece situated thereon, abutting the stop rail, are shown in section.
Figure 8:
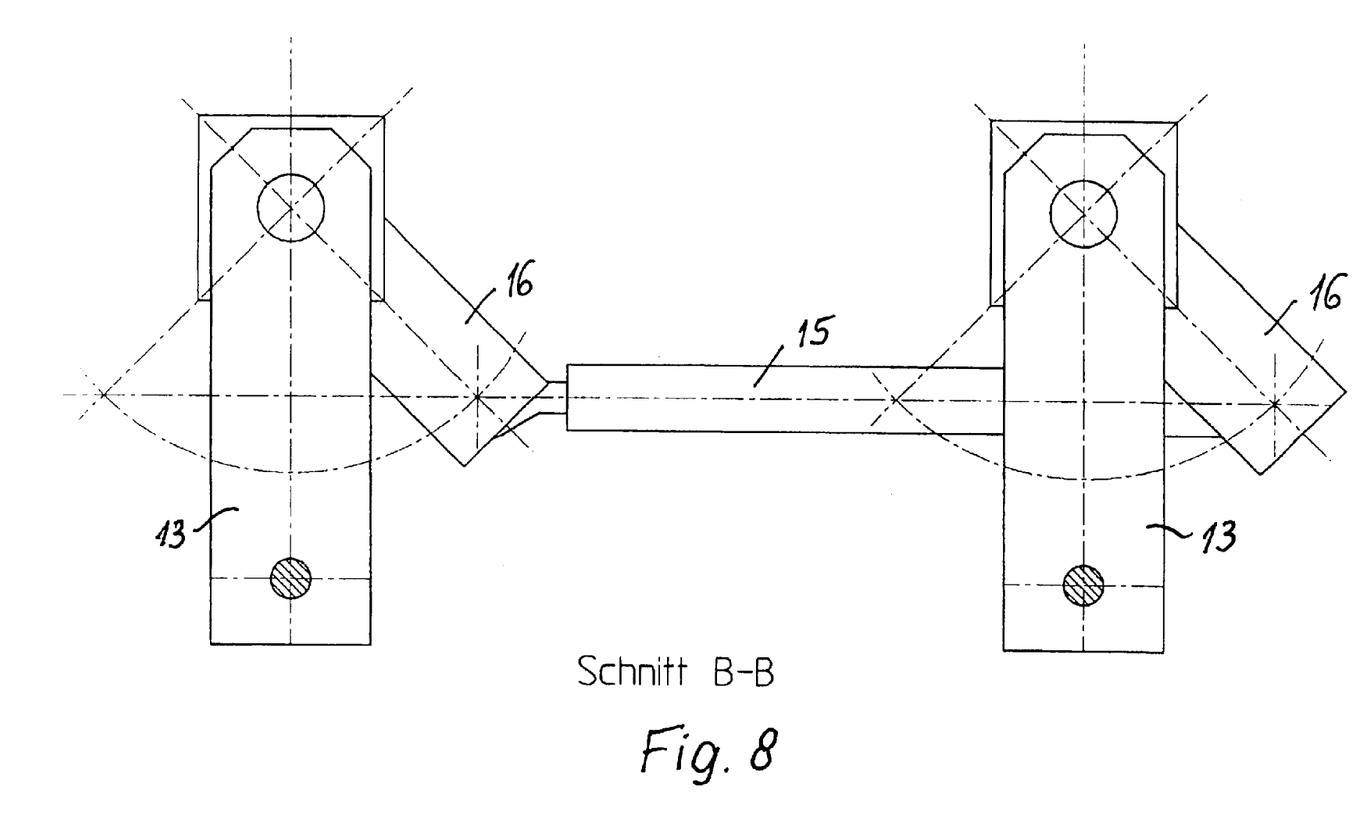
FIG. 8 is a section taken along the line B—B in FIG. 6, with a view of the swivel arms for the rail supported by them, in the position of use.

Furthermore, FIGS. 6 to 8 show a displaceable stop rail 11 that can be situated on at least one edge of the machining or bearing surface for the workpiece 2, and which can be moved out of its stop position, shown particularly clearly in FIG. 7, in order in this way to expose an edge 2a of the workpiece 2 after this workpiece was previously aligned thereon, so that this edge 2a is then also accessible for machining.

According to FIG. 6, the stop rail 11 extends over the entire dimension of a side of the working surface, and has on one end a stop 12 or sliding stop that protrudes at a right angle to its orientation, with which an edge, running at a right angle to the edge 2a, of the plate-shaped workpiece can be aligned and fixed, so that the workpiece 2 receives the desired adjusted position on the suction consoles 3 or on the base plate 10, and can then be clamped fast.

On the basis of FIGS. 6 to 8, it can be seen that the stop rail 11 is fastened on swivel arms 13 that can be swiveled approximately in a plane situated parallel to the working surface. For this purpose, they are supported by a swivel bearing 14 which is oriented approximately vertically.

In the exemplary embodiment, the two swivel arms 13, which engage on the stop rail 11, are situated parallel to one another and can be swiveled synchronously, which is effected with the aid of a connecting rod 15.

Here it can be seen that drive arms 16, which stand parallel to one another in relation to the swivel arms 13 and are offset by an angular distance according to FIG. 8, are provided on the swivel axis, running through swivel bearing 14, at a distance from stop rail 11, on which arms a drive (in the exemplary embodiment, a working cylinder 17 and connecting rod 15) engage, so that a single drive suffices for the swiveling of both drive arms 16, and thus also both of the swivel arms 13.

FIG. 8 is a top view of the two swivel arms 13, without the stop rail 11 that is supported by them and that is situated in the position of use in this arrangement. If the drive arms are swiveled to the left by a right angle out of the depicted position of use, the swivel arms 13 are also displaced by the same angular distance, i.e., into a position approximately parallel to the edge 2a of the workpiece 2; that is, in the position of use, the swivel arms 13 are situated at a right angle to the stop rail 11, and the drive arms 16 are displaced in relation thereto by an acute angle, in the exemplary embodiment by approximately 45°, so that a swiveling of the drive arms 16 by 90° brings the swivel arms 13 and the stop rail 11 into a position parallel to one another, and simultaneously into accordance with one another, resulting in a space-saving idle position.

The machine tool 1 for the at least partial machining, contour-dependent cutting or milling of a component from a plate-shaped workpiece 2, for example a wood plate, having a suction device used as a clamping device for engaging on the back side or lower side of the workpiece 2, has as a second clamping device at least one hold-down device 6 that is used to apply pressure to the side of workpiece 2 facing away from suction device 3 and 4. The hold-down device 6 has on its contact region that applies pressure to the workpiece 2 at least one or two pressure rollers 7 at a distance from one another, and being displaceable under pressure relative to the workpiece 2 transversely to the axis of pressure roller 7, this displacement being synchronous with a tool 8 used for the machining of the workpiece 2, which tool can preferably be situated between the two pressure rollers 7 that are at a distance from one another.

What is claimed is:

1. Machine tool (1) for at least partial machining, contour-dependent cutting or milling of a component from a plate-shaped workpiece (2), comprising: a suction apparatus used as a clamping device for engaging a back side or lower side of the workpiece (2), the suction apparatus having individual suction devices (4) that are located in displaceable fashion on a machine frame (5) of the machine tool (1), a second clamping device including a hold-down device (6) that is used to apply pressure to a side of the workpiece (2) facing away from the suction apparatus (3, 4), the hold-down device (6) has on a contact region that applies pressure to the workpiece (2) at least one of a pressure roller (7) or two spaced-apart pressure rollers spaced at a distance from one another, the hold-down device is displaceable under pressure relative to the workpiece (2), transversely to an axis of the pressure roller (7), and the hold-down device (6) can be displaced synchronously with a tool (8) used for machining of the workpiece (2), the suction apparatus has at least one suction console (3), on which the individual heads of the suction devices(4) are situated in detachable and removable fashion, and an exchangeable base plate (10) is provided as support for the workpiece (2), the base plate fitting onto the suction console (3) and being used thereon to support the workpieces (2) that are clamped with the hold-down device (6).

2. The machine tool as recited in claim 1, wherein the hold-down device (6) includes the two spaced-apart pressure rollers (7) which are arranged parallel to one another, and are connected with an advancing device (9) for the tool (8).

3. The machine as recited in claim 2, wherein the tool (8) comprises a milling cutter situated in an intermediate space between the two pressure rollers (7), and the advancing device (9) for displacing the tool (8) is also used to displace the pressure rollers (7) of the hold-down device (6).

4. The machine as recited in claim 1, wherein a length of the pressure roller (7) corresponds generally to the width of the workpiece (2) to be machined, or to a width or a length of a bearing surface, provided on the machine (1), for the workpiece (2).

5. Machine tool (1) for at least partial machining, contour-dependent cutting or milling of a component from a plate-shaped workpiece (2), comprising: a suction apparatus used as a clamping device for engaging a back side or lower side of the workpiece (2), the suction apparatus having individual suction devices (4) that are located in displaceable fashion on a machine frame (5) of the machine tool (1), a second clamping device including a hold-down device (6) that is used to apply pressure to a side of the workpiece (2) facing away from the suction apparatus (3. 4), the hold-down device (6) has on a contact region that applies pressure to the workpiece (2) at least one of a pressure roller (7) or two spaced-apart pressure rollers spaced at a distance from one another, the hold-down device is displaceable under pressure relative to the workpiece (2), transversely to an axis of the pressure roller (7), and the hold-down device (6) can be displaced synchronously with a tool (8) used for machining of the workpiece (2), a stop rail (11) situated on at least one edge of a machining or working surface for the workpiece (2), wherein the stop rail (11) extends over an entire dimension of one side of the working surface, and includes on at least one end a stop (12) or sliding stop that protrudes at a right angle thereto, the stop being displaceable and fixable in a longitudinal direction of the stop rail.

6. The machine as recited in claim 5, further comprising the stop rail (11) being moveable away from a stop position so as to expose an edge (2a) of the workpiece (2) previously aligned thereon.

7. Machine tool (1) for at least partial machining, contour-dependent cutting or milling of a component from a plate-shaped workpiece (2), comprising: a suction apparatus used as a clamping device for engaging a back side or lower side of the workpiece (2), the suction apparatus having individual suction devices (4) that are located in displaceable fashion on a machine frame (5) of the machine tool (1), a second clamping device including a hold-down device (6) that is used to apply pressure to a side of the workpiece (2) facing away from the suction apparatus (3, 4), the hold-down device (6) has on a contact region that applies pressure to the workpiece (2) at least one of a pressure roller (7) or two spaced-apart pressure rollers spaced at a distance from one another, the hold-down device is displaceable under pressure relative to the workpiece (2), transversely to an axis of the pressure roller (7), and the hold-down device (6) can be displaced synchronously with a tool (8) used for machining of the workpiece (2), the stop rail (11) situated on at least one edge of a machining or working surface for the workpiece (2), the rail being moveable away from a stop position so as to expose an edge (2a) of the workpiece (2) previously aligned thereon, the stop rail (11) is fastened to swivel arms (13) that are swivelable approximately in a plane that is situated parallel to the working surface, the swivel arms (13) that engage on the stop rail (11) are situated parallel to one another, and are synchronously swivelable, and drive arms (16) are provided that stand parallel to one another on a swivel axis of the swivel arms, at a distance from the stop rail (11) and offset in relation to the swivel arms by an angular distance, on which drive arms a rotational drive engages.

8. The machine as recited in claim 7, wherein in the position of use of the stop rail (11), the swivel arms (13) are situated at a right angle thereto, and the drive arms (16) are offset at an acute angle in relation thereto so that a swiveling of the drive arms (16) by about 90° brings the swivel arms (13) and the stop rail (11) into a position parallel to one another.

* * * * *